H. S. RAND.
GATE.
APPLICATION FILED MAR. 16, 1920.
1,428,904.  Patented Sept. 12, 1922.
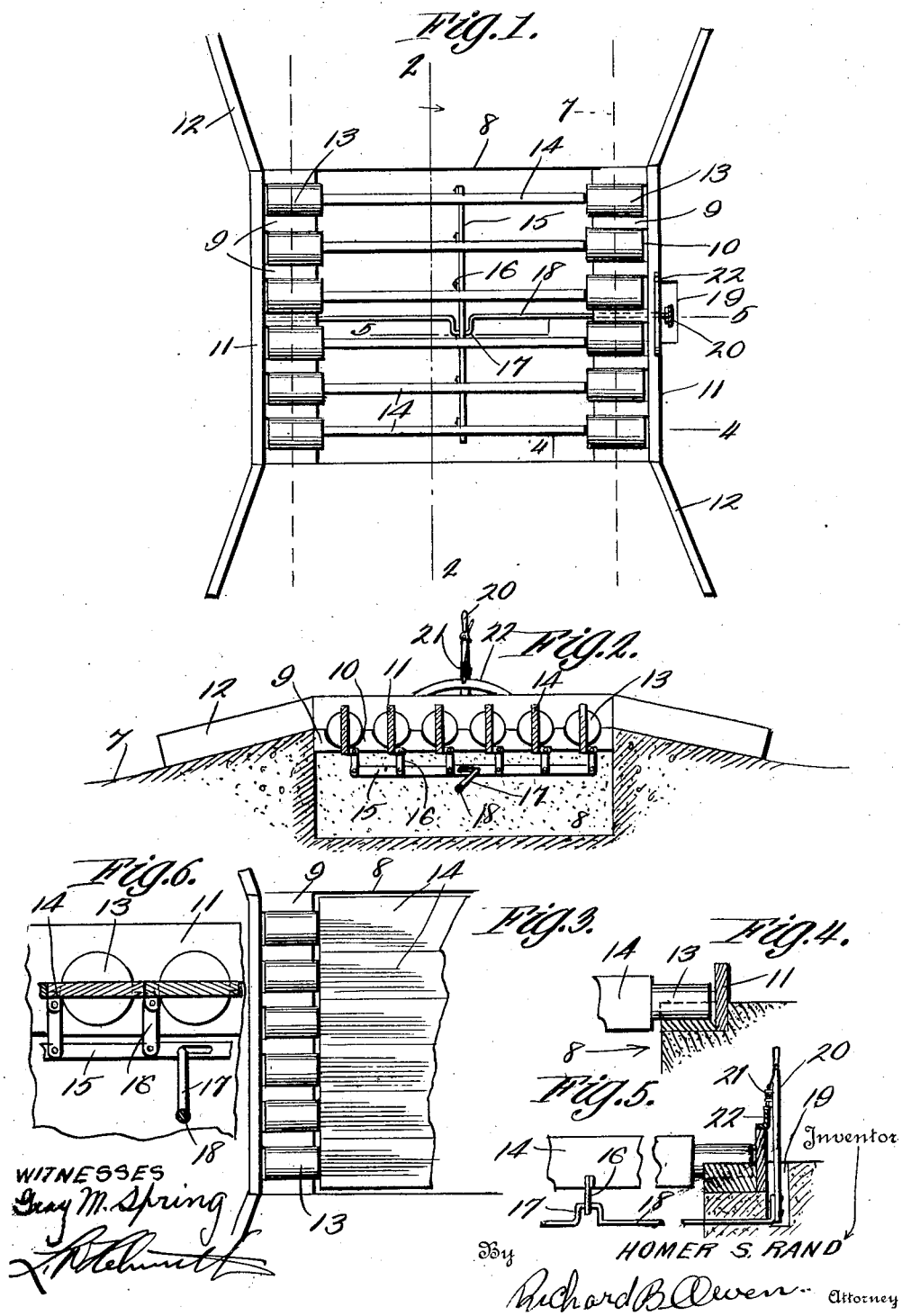

Patented Sept. 12, 1922.

1,428,904

UNITED STATES PATENT OFFICE.

HOMER S. RAND, OF PLAINVILLE, KANSAS.

GATE.

Application filed March 16, 1920. Serial No. 366,262.

*To all whom it may concern:*

Be it known that I, HOMER S. RAND, a citizen of the United States, residing at Plainville, in the county of Rooks and State of Kansas, have invented certain new and useful Improvements in Gates, of which the following is a specification.

This invention relates to new and useful gates of a peculiar type and which are particularly designed to form a part of a roadway for preventing animals from passing thereover at times and which will always permit the passage of a vehicle thereover, but it is of course obvious that the invention may be adapted to be used in connection with railways for preventing animals from trespassing upon the tracks thereof.

Another important object of the invention is to provide a device of the above nature which may be operated to permit the passage of animals and animal drawn vehicles.

Another object of the invention is to provide a device of the above nature which is strong, durable, inexpensive to manufacture and install and is highly efficient in practice.

Other objects and advantages of the invention will become apparent during the course of the following description.

In the accompanying drawings, forming a part of the description, and wherein like numerals are employed to designate like parts throughout the several views:—

Figure 1 is a top plan of the invention applied to a roadway,

Figure 2 is a section of the same taken on the line 2—2 of Fig. 1.

Figure 3 is a fragmentary top plan of the invention illustrating its position to permit the passage of animals thereover, Figure 4 is a fragmentary elevation of one of the tread members illustrating the manner of mounting the same.

Figure 5 is a fragmentary transverse section taken on the line 5—5 of Fig. 1, and Figure 6 is an enlarged fragmentary transverse section taken through the tread portion of the invention.

Referring to the drawings, wherein is illustrated a preferred embodiment of my invention, the numeral 7 designates a roadway having a pit 8 of any suitable dimensions therein, the pit in the present instance being illustrated as cemented. Upon opposite sides of the pit and extending longitudinally of the roadway are supporting beams 9, the upper faces of which are flush with the roadway as most clearly shown in Fig. 2. The upper face of each supporting beam is provided with a plurality of slightly spaced transversely extending recesses 10 which are substantially semi-circular in cross section to form bearings for a purpose which will presently appear. It is, of course, to be understood that the supporting beams 9 may be formed of cement and integral with the cement pit 8. A vertically disposed guide or guard 11 is secured in position upon the outside of each supporting beam 9 and outwardly diverging guides 12 are provided upon the ends of the guides 11.

The tread portion of the device at times, merely provides longitudinally extending side treads whereby only autos, trucks and the like may pass over the gate, while at other times the tread portion may be disposed to provide one continuous tread to permit of the passage of animals and animal drawn vehicles. A roller of cylindrical member 13 is positioned to oscillate in each recess or bearing 10 of the supporting beams 9 and these rollers being alined longitudinally of the roadway form a side tread adjacent each side of the roadway. As the guides 11 are disposed upon the outer side of each supporting beam 9, the rollers 13 are prevented to a certain extent from moving transversely of the roadway or outwardly of the sides thereof. A plank 14 connects each pair of oppositely disposed rollers 13 and forms a center tread which is normally so arranged as to prevent the passage of animals, due to the fact that the planks are normally arranged in vertical planes.

The means for oscillating the rollers 13 to arrange the planks 14 in the same horizontal plane, consists of an operating bar 15 which extends longitudinally of the roadway within the pit 8 and is supported therein by links 16 being secured thereto and pivotally connected with the planks 14. The center portion of this operating bar is provided with an elongated longitudinally extending slot through which extends and is operable therein the crank 17 of a shaft 18 which extends through the pit and transversely of the roadway. The free ends of the shaft 18 are journaled in the sides of the pit as most clearly shown in Figure 5 and one end of the shaft is bent upwardly as shown in Figure 5 to be arranged within a recess 19 in the concrete pit and secured to the lower end of an operating lever 20. The lever is equipped with the ordinary spring pressed and lever operated pawl which cooperates with a segment 22 secured to one of the guides 11. This segment is equipped with a pair of notches so that the lever 20 may be maintained in either position to retain the planks 14 in a horizontal or vertical position.

When the device is in use, its normal position is such as is clearly shown in Figures 1 and 2, in other words, the planks 14 are disposed in vertical planes and are spaced apart so as to prevent animals from passing over the gate. However, the rollers 13 constituting the side treads are always arranged in the same relation and accordingly, autos, trucks and the like may at all times pass over the gate. At this point, it may be mentioned, that the rollers 13 are relatively short so as to prevent animals from walking thereover to pass the gate. However, should an animal attempt this act, his footing will be so uncertain due to the shape of the rollers, that he will become frightened and return. It will of course be obvious that the animal will not attempt to use the center tread of the gate when it is arranged in its normal position, due to the uncertain footing, but should an animal attempt the same, in all probability his legs will drop in between the planks 14 and frighten the animal to such an extent that it would not desire to make a second attempt to cross.

When it is desired to render the middle tread operable so that animal drawn vehicles may pass thereover, the lever 20 is swung to cause the crank to turn and operate in the slot in the operating bar 15 to cause the latter to move vertically and longitudinally of the roadway whereby the rollers are oscillated and the planks 14 swung to be arranged in the same horizontal plane, as most clearly shown in Figs. 3 and 6. As seen in these figures, the longitudinal edges of the planks will almost abut and the planks will form a continuous flat tread whereby animals may safely walk thereon. When it is desired to again space the planks 14 and dispose them in vertical planes, the lever 20 is swung to a vertical position as more clearly shown in Fig. 2, which action will rotate the shaft 18 and cause the crank to lower thereby causing the links 16 to act upon the planks to move them to vertical positions.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:—

1. A stock gate comprising a pair of spaced longitudinally extending side bars having a plurality of transverse upwardly opening bearings therein, the bearings in said bars being oppositely disposed a roller mounted in each bearing to be partially exposed to form treads, and a plank connecting each pair of oppositely disposed rollers.

2. A stock gate comprising relatively narrow side treads consisting of a plurality of longitudinally alined rollers, and a relatively wide center tread consisting of a plurality of planks each connecting a pair of opposite disposed side rollers.

3. A stock gate comprising sets of rollers at each side of the gate and which form relatively narrow treads for motor driven vehicles, and slats connecting the rollers of the two sets and normally arranged vertically to prevent the passage of animals.

4. A stock gate comprising a plurality of slats normally arranged in vertical planes to normally prevent the passage of animals thereover, each end of each slat being provided with a roller, the rollers at opposite ends of the slats being partly exposed and forming relatively narrow treads for the passage of motor driven vehicles, and means for revolving the rollers and disposing the slats in the same horizontal plane to form a tread for the passage of animals.

In testimony whereof I affix my signature in presence of two witnesses.

HOMER S. RAND.

Witnesses:
W. H. BARTLETT,
MARGUERITE SPELLMAN.